Jan. 13, 1925.
J. B. FOOTE
SHAFT COUPLING
Filed June 4, 1921
1,522,774
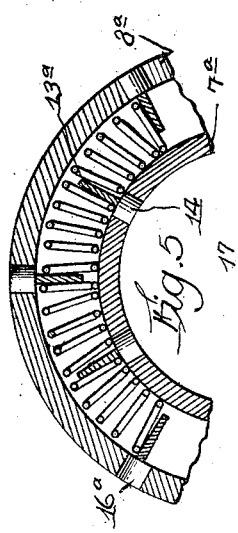
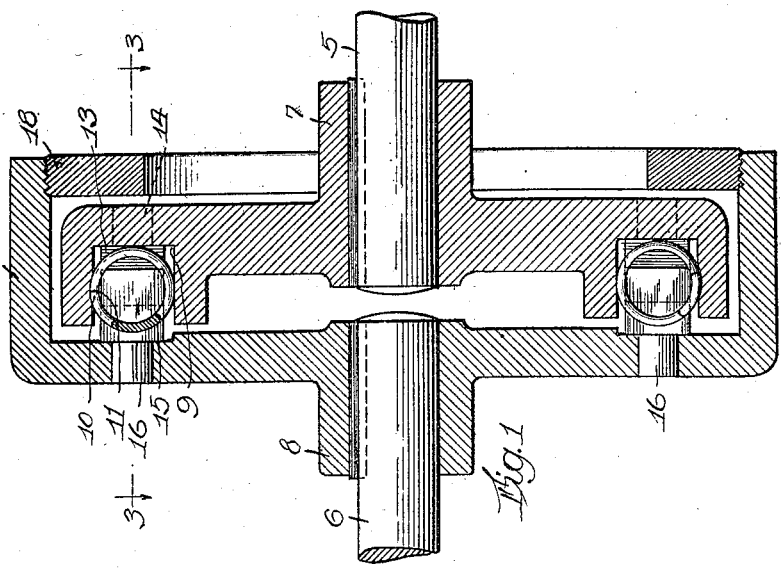
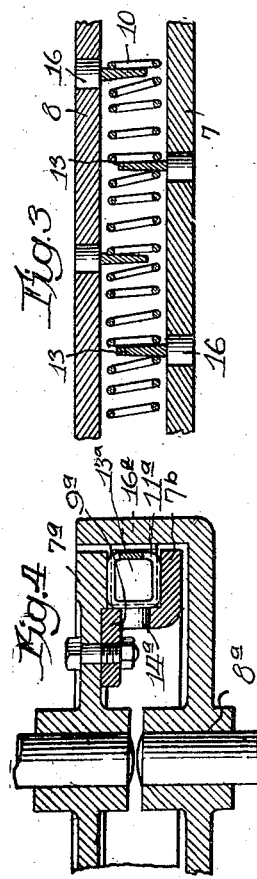
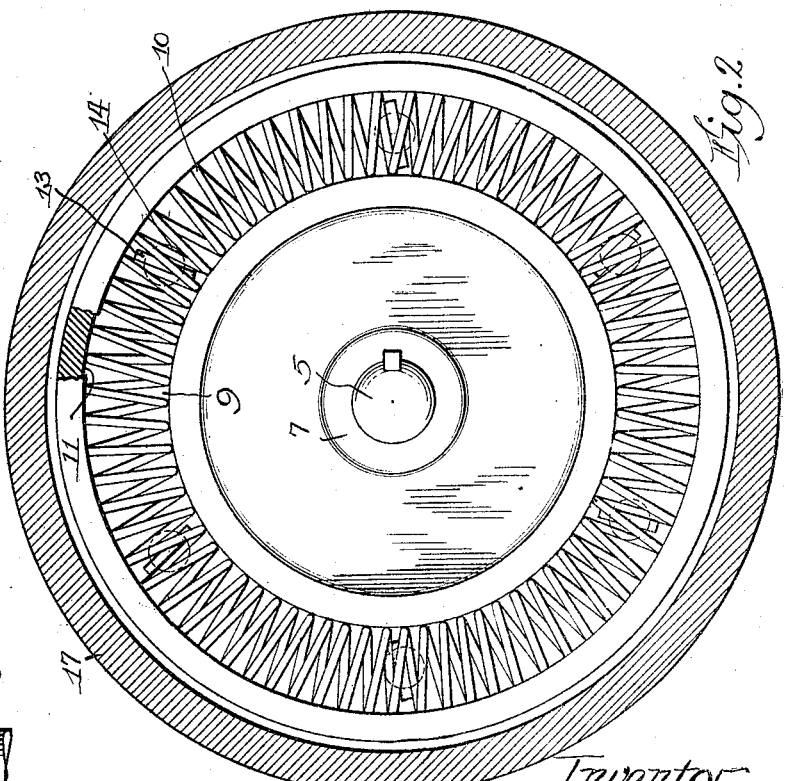

Patented Jan. 13, 1925.

1,522,774

UNITED STATES PATENT OFFICE.

JOHN B. FOOTE, OF OAK PARK, ILLINOIS; JOHN T. KERWIN ADMINISTRATOR OF SAID JOHN B. FOOTE, DECEASED.

SHAFT COUPLING.

Application filed June 4, 1921. Serial No. 475,084.

*To all whom it may concern:*

Be it known that I, JOHN B. FOOTE, a citizen of the United States, and a resident of Oak Park, in the county of Cook and State of Illinois, have invented certain new and useful Improvements in Shaft Couplings, of which the following is a full, clear, and exact description.

The invention relates to shaft couplings and its object is to provide an improved flexible coupling between shafts by which shafts, which are out of alignment, will be driven without transmitting displacing stresses from one shaft to the other.

The invention consists in the several novel features hereinafter set forth and more particularly defined by claims at the conclusion hereof.

In the drawings: Fig. 1 is a longitudinal section of a coupling embodying the invention. Fig. 2 is a section taken on line 2—2 of Fig. 1. Fig. 3 is a section taken on line 3—3 of Fig. 2. Fig. 4 is a longitudinal section of a modification. Fig. 5 is a transverse section of the coupling shown in Fig. 4.

The invention is exemplified in a coupling which is applied as a driving connection between shafts 5 and 6. In practice, the difficulty of retaining shafts in actual alignment is generally recognized, because, as the result of settling of the foundation or irregularity in manufacture, they are seldom brought or maintained in that true coaxial alignment which is necessary for the operation of one shaft from another without vibration or wear upon the bearings for the shafts. Such wear and vibration are exceptionally severe when the axes of the shafts are parallel, but non-coincident. A coupling member 7 is fixed to the shaft 5 and a coupling member 8 is fixed to the shaft 6. An annular channel 9 is formed in one face of the member 7 and a coil spring 10 is disposed in said channel. For the purpose of conveniently holding it in the channel, one of the sides thereof is formed with a shallow recess 11, into which the spring may be forced to form an interfitting connection between the spring and the coupling member 7 by which the spring will be held against displacement from said member. The spring 11 is a continuous coil spring. In practice, the spring is formed as a straight coil in usual manner and the ends are brazed or welded together so as to form an annular continuous spring which will fit in the annular retainer groove 9. Abutments 13 are disposed in the channel and provided with studs 14 which are pivotally held in the coupling member 7. Abutments 13 are adapted to extend between the coils of the spring to form elements which are adapted to engage a coil of the spring and to drive it or be driven thereby. Similar abutments 15 are provided with studs 16 which are pivotally held in the coupling member 8 and are adapted to extend into the channel 9 and to engage the coils of the spring and to drive it or be driven thereby. The abutments in the coupling-members form opposing abutments between which portions of the coil spring are held. Preferably, the number of convolutions of the coil should be a multiple of the number of abutments 13, 15, so that the abutments will be evenly distributed throughout the spring. It will be understood that there is sufficient clearance between the abutments 15 and the coupling members 7 and 8 to permit the necessary relative movement between the coupling members which is incident to their operation. Member 8 is provided with a rim 17 outside of the periphery of the coupling member 7 which is provided with an internal collar 18 to prevent excessive separation of the coupling members.

In operation, the abutments on one member will engage certain coils of the spring to drive the opposed abutments on the other member through the intermediate portions of the spring. In this operation, the pivoted abutments are free to adapt themselves to the contacting coils of the spring during the expansion and contraction thereof. The resiliency of the coupling may be varied by shifting the coacting abutments on the members respectively into different coils, so that the number of coils between the coacting driving and driven abutments will be varied. The greater the number of coils between each pair of opposed abutments, the greater the resiliency of the connection. Obviously, when one of the shafts is rotated, the abutments on its coupling member will drive the other shaft through the abutments and the interposed coils of the spring. In practice it has been found that the abutments which are pivoted so they will be free for self-adjustment responsively to variations in the form of the spring during operation constitutes an important feature in eliminating vibration and displacing stresses between the coupling members or the shafts. The use of a continuous spring, as contradistinguished from individual springs, has also been found to be important in practice, because it insures a substantially equalized pressure between the opposed driving abutments and because, while the coils of those portions of the spring in front of the driving abutments are put under compression, the coils in the rear thereof will be subjected to a pull or tensile stresses.

A modification of the invention is shown in Fig. 4, in which the channel 9ª for the spring 11ª is formed in the periphery of the coupling-member 7ª which comprises a removable section 7ᵇ. Spring 11ª has substantially rectangular coils. The abutments 13ª in member 7ª are provided with radially extending studs 14ª. The coupling member 8ª is provided with a rim outside of the channel 9ª in which the radially extending abutments 15ª are pivotally held by studs 16.

The invention exemplifies improved driving coupling which, in practice, has been found to operate smoothly and without imparting displacing stresses from one shaft to the other. It has been found to be especially effective where the axes of the shafts are non-coincident.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A driving connection comprising a pair of independently supported coupling members, driving abutments on the members, and spring coils between the abutments on the members respectively, the abutments being rotatably supported in the members respectively so as to be free for self-adjustment responsive to variations in the form of the spring during operation of the coupling members, the abutments and spring coil driving one member from the other without relative radial-displacing stresses when the members are not truly coaxial.

2. In a coupling, the combination of a pair of independently supported coupling members, abutments rotatable in the members respectively, and an annular continuous coil spring between the members, the abutments being free for self-adjustment responsive to variations in the form of the spring during operation of the coupling members and extending between the coil of the spring, the abutments and spring coil driving one member from the other without relative radial-displacing stresses when the members are not truly coaxial.

3. In a coupling, the combination of a pair of coupling members, abutments on the coupling members respectively, and an annular continuous coil spring between the members, the abutments being rotatably held in the members so as to be free for self-adjustments responsive to variations in the form of the spring during operation of the coupling members and extending between the coil of the spring.

4. In a coupling, the combination of a pair of members, one of which has an annular channel in one of its faces and a recess in one of the sides of the channel, an annular continuous coil spring in said channel and extending into the recess, and abutments rotatable in the members free for self-adjustment responsive to variations in the form of the spring during operation of the coupling members and extending between the coils of the spring.

JOHN B. FOOTE.